(12) United States Patent
Seki

(10) Patent No.: US 8,363,655 B2
(45) Date of Patent: Jan. 29, 2013

(54) ROUTER DEVICE AND SCALABILITY IMPROVEMENT METHOD FOR USE THEREIN

(75) Inventor: Koji Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 97 days.

(21) Appl. No.: 12/545,228

(22) Filed: Aug. 21, 2009

(65) Prior Publication Data

US 2010/0061372 A1 Mar. 11, 2010

(30) Foreign Application Priority Data

Sep. 10, 2008 (JP) ................................ 2008-231594

(51) Int. Cl.
*H04L 12/28* (2006.01)
(52) U.S. Cl. ........................ 370/392; 709/201
(58) Field of Classification Search .................. 370/392; 709/201
See application file for complete search history.

(56) References Cited

U.S. PATENT DOCUMENTS

| | | | | |
|---|---|---|---|---|
| 3,974,343 | A * | 8/1976 | Cheney et al. ................ | 379/244 |
| 2001/0021189 | A1 | 9/2001 | Shiota | |
| 2003/0031192 | A1 | 2/2003 | Furuno | |
| 2004/0196827 | A1 | 10/2004 | Xu et al. | |
| 2005/0169270 | A1 * | 8/2005 | Mutou et al. ................ | 370/390 |
| 2006/0036768 | A1 * | 2/2006 | Furukawa et al. ............ | 709/245 |
| 2007/0291764 | A1 * | 12/2007 | Wu ............................ | 370/395.5 |

FOREIGN PATENT DOCUMENTS

| | | |
|---|---|---|
| JP | 2001251351 A | 9/2001 |
| JP | 2001348546 A | 12/2001 |
| JP | 2002164937 A | 6/2002 |
| JP | 2003051844 A | 2/2003 |
| JP | 2006180494 A | 7/2006 |
| JP | 2006311427 A | 11/2006 |
| JP | 2007074311 A | 3/2007 |
| JP | 2007082225 A | 3/2007 |
| WO | 2004084506 A1 | 9/2004 |

OTHER PUBLICATIONS

Japanese Office Action for JP2008-231594 mailed on Aug. 14, 2012.
Japanese Office Action for JP2008-231594 mailed on Nov. 20, 2012.
Rinne Watanabe et al., MPLS label switching router implementation enhanced with Network Processor, IPSJ SIG Technical Report (2003-QA1-7), Information Processing Society of Japan, May 21, 2003, vol. 2003, No. 50, pp. 71-76.

* cited by examiner

*Primary Examiner* — Robert Wilson
*Assistant Examiner* — Wei Zhao

(57) ABSTRACT

A router device has a line relay processing unit including a PUSH processing unit for adding a label to a frame and forwarding the frame and a POP processing unit for removing the label from the frame and forwarding the frame, and a relay processing unit including a SWAP processing unit for swapping the label of the frame and forwarding the frame.

15 Claims, 13 Drawing Sheets

RELAY PROCESSING FIB

| LSP NUMBER | RECEPTION PORT | RECEPTION LABEL | TRANSMISSION PORT | TRANSMISSION LABEL | MPLS PROCESSING |
|---|---|---|---|---|---|
| LSP#X1 | LINE PORT B1 | ... | LINE PORT A1 | EXTERNAL LABEL X1 | PUSH |
| LSP#Y1 | LINE PORT A1 | EXTERNAL LABEL Y1 | LINE PORT B1 | ... | POP |
| LSP#X2 | LINE PORT B2 | ... | LINE PORT A2 | EXTERNAL LABEL X1 | PUSH |
| LSP#Y2 | LINE PORT A2 | EXTERNAL LABEL Y2 | LINE PORT B2 | ... | POP |

FIG. 2 RELATED ART

RELAY PROCESSING FIB (WHEN USING INTERNAL LABELS)

| LSP NUMBER | RECEPTION PORT | RECEPTION LABEL | TRANSMISSION PORT | TRANSMISSION LABEL | MPLS PROCESSING |
|---|---|---|---|---|---|
| LSP#X1 | INTERNAL PORT C1 | INTERNAL LABEL X1 | LINE PORT A1 | EXTERNAL LABEL X1 | SWAP |
| LSP#Y1 | LINE PORT A1 | EXTERNAL LABEL Y1 | INTERNAL PORT C1 | INTERNAL LABEL Y1 | SWAP |
| LSP#X2 | INTERNAL PORT C1 | INTERNAL LABEL X2 | LINE PORT A2 | EXTERNAL LABEL X1 | SWAP |
| LSP#Y2 | LINE PORT A2 | EXTERNAL LABEL Y2 | INTERNAL PORT C1 | INTERNAL LABEL Y2 | SWAP |

FIG. 6

LINE RELAY PROCESSING FIB (WHEN USING INTERNAL LABELS)

| LSP NUMBER | RECEPTION PORT | RECEPTION LABEL | TRANSMISSION PORT | TRANSMISSION LABEL | MPLS PROCESSING |
|---|---|---|---|---|---|
| LSP#X1 | LINE PORT B1 | ... | INTERNAL PORT C1 | INTERNAL LABEL X1 | PUSH |
| LSP#Y1 | INTERNAL PORT C1 | INTERNAL LABEL Y1 | LINE PORT B1 | ... | POP |
| LSP#X2 | LINE PORT B2 | ... | INTERNAL PORT C1 | INTERNAL LABEL X2 | PUSH |
| LSP#Y2 | INTERNAL PORT C1 | INTERNAL LABEL Y2 | LINE PORT B2 | ... | POP |

FIG. 7

RELAY PROCESSING FIB (WHEN USING ONLY EXTERNAL LABELS)

| LSP NUMBER | RECEPTION PORT | RECEPTION LABEL | TRANSMISSION PORT | TRANSMISSION LABEL | MPLS PROCESSING |
|---|---|---|---|---|---|
| LSP#X1 | INTERNAL PORT C1 | EXTERNAL LABEL X1 | LINE PORT A1 | EXTERNAL LABEL X1 | SWAP |
| LSP#Y1 | LINE PORT A1 | EXTERNAL LABEL Y1 | INTERNAL PORT C1 | EXTERNAL LABEL Y1 | SWAP |
| LSP#X2 | INTERNAL PORT C1 | EXTERNAL LABEL X1 | LINE PORT A2 | EXTERNAL LABEL X1 | SWAP |
| LSP#Y2 | LINE PORT A2 | EXTERNAL LABEL Y2 | INTERNAL PORT C1 | EXTERNAL LABEL Y2 | SWAP |

FIG. 8

LINE RELAY PROCESSING FIB (WHEN USING ONLY EXTERNAL LABELS)

| LSP NUMBER | RECEPTION PORT | RECEPTION LABEL | TRANSMISSION PORT | TRANSMISSION LABEL | MPLS PROCESSING |
|---|---|---|---|---|---|
| LSP#X1 | LINE PORT B1 | ... | INTERNAL PORT C1 | EXTERNAL LABEL X1 | PUSH |
| LSP#Y1 | INTERNAL PORT C1 | EXTERNAL LABEL Y1 | LINE PORT B1 | ... | POP |
| LSP#X2 | LINE PORT B2 | ... | INTERNAL PORT C1 | EXTERNAL LABEL X1 | PUSH |
| LSP#Y2 | INTERNAL PORT C1 | EXTERNAL LABEL Y2 | LINE PORT B2 | ... | POP |

FIG. 9

ROUTER DEVICE AND SCALABILITY IMPROVEMENT METHOD FOR USE THEREIN

This application is based upon and claims the benefit of priority from Japanese patent application No. 2008-231594, filed on Sep. 10, 2008, the disclosure of which is incorporated herein in its entirety by reference.

BACKGROUND OF THE INVENTION

1. Field of the Invention

This invention relates to a router device and a scalability improvement method for use therein, and particularly relates to a method for improvement of scalability for maximum LSP (Label Switched Path) number of an MPLS (Multi Protocol Label Switching) edge router.

2. Description of the Related Art

An MPLS edge router according to a related art has a PUSH processing unit and a POP processing unit both disposed in a relay processing unit. PUSH processing is processing to add a label to a frame and forward the labeled frame, performed in an edge router (Label Edge Router, hereafter abbreviated as LER) serving as an entrance to an MPLS network. POP processing is processing to remove the label from the frame and forward the frame, performed in the edge router (LER) serving as an exit from the MPLS network.

Relay processing in MPLS networks is described, for example, in Japanese Laid-Open Patent Publication Nos. 2002-164937, 2006-180494, 2006-311427, and 2007-082225.

SUMMARY OF THE INVENTION

In an edge routers according to related art, PUSH processing and POP processing in a relay processing unit consume more hardware resources than SWAP processing in a core router (Label Switch Router, hereafter abbreviated as LSR). Describing more specifically, the SWAP processing is processing performed in the LSR to swap the (outermost) frame label and forward the same. The PUSH processing and POP processing possibly consume more hardware resources than the SWAP processing since a plurality of layers of labels possibly have to be processed simultaneously. Accordingly, a maximum LSP number in the edge router depends on a quantity of hardware resources available for the relay processing unit However, a relay processing unit of a known edge router has insufficient scalability for maximum LSP number.

Further, the edge router according to the related art has only one relay processing unit. Such a edge router cannot include different types of line ports or provide appropriate services to the different types of line ports.

It is an exemplary object of this invention to provide a router device having improved scalability to make it possible to increase the maximum LSP number, and to provide a scalability improvement method for use in such a router device.

More specifically, it is an exemplary object of the invention to provide a router device having a line relay processing unit which is capable of including line ports for a variety of types of lines and which allows hardware resources to be added thereto, so that the scalability for maximum LSP number of the MPLS edge router can be improved without depending on the hardware resources of the relay processing unit. It is also an exemplary object of the invention to provide a scalability improvement method for use in such router devices.

An exemplary aspect of this invention provides a router device for relaying a frame in an MPLS network. The router device has a line relay processing unit including a PUSH processing unit for adding a label to the frame and forwarding the frame and a POP processing unit for removing the label from the frame and forwarding the frame, and a relay processing unit including a SWAP processing unit for swapping the label of the frame and forwarding the frame.

Another exemplary aspect of this invention provides a scalability improvement method for use in a router device for relaying a frame in an MPLS network, wherein there are provided a line relay processing unit including a PUSH processing unit for adding a label to the frame and forwarding the frame and a POP processing unit for removing the label from the frame and forwarding the frame, and a relay processing unit including a SWAP processing unit for swapping the label of the frame and forwarding the frame.

According to the router device and the scalability improvement method of the invention, a line relay processing unit which is capable of including line ports for a variety of types of lines and which allows hardware resources to be added thereto is provided, whereby the scalability for maximum LSP number of an MPLS edge router can be improved without depending on hardware resources of the relay processing unit.

BRIEF DESCRIPTION OF THE DRAWINGS

FIG. 2 is a diagram showing a configuration example of a relay processing FIB contained in the edge router shown in FIG. 1;

FIG. 6 is a diagram showing a configuration example of a relay processing FIB contained in the edge router shown in FIG. 3;

FIG. 7 is a diagram showing a configuration example of a line relay processing FIB contained in the edge router shown in FIG. 3;

FIG. 8 is a diagram showing a configuration example of the relay processing FIB when no internal label is used;

FIG. 9 is a diagram showing a configuration example of the line relay processing FIB when no internal label is used;

DESCRIPTION OF EXEMPLARY EMBODIMENTS OF THE INVENTION

This invention will be described by way of exemplary preferred embodiments with reference to the accompanying drawings.

Figure 1:
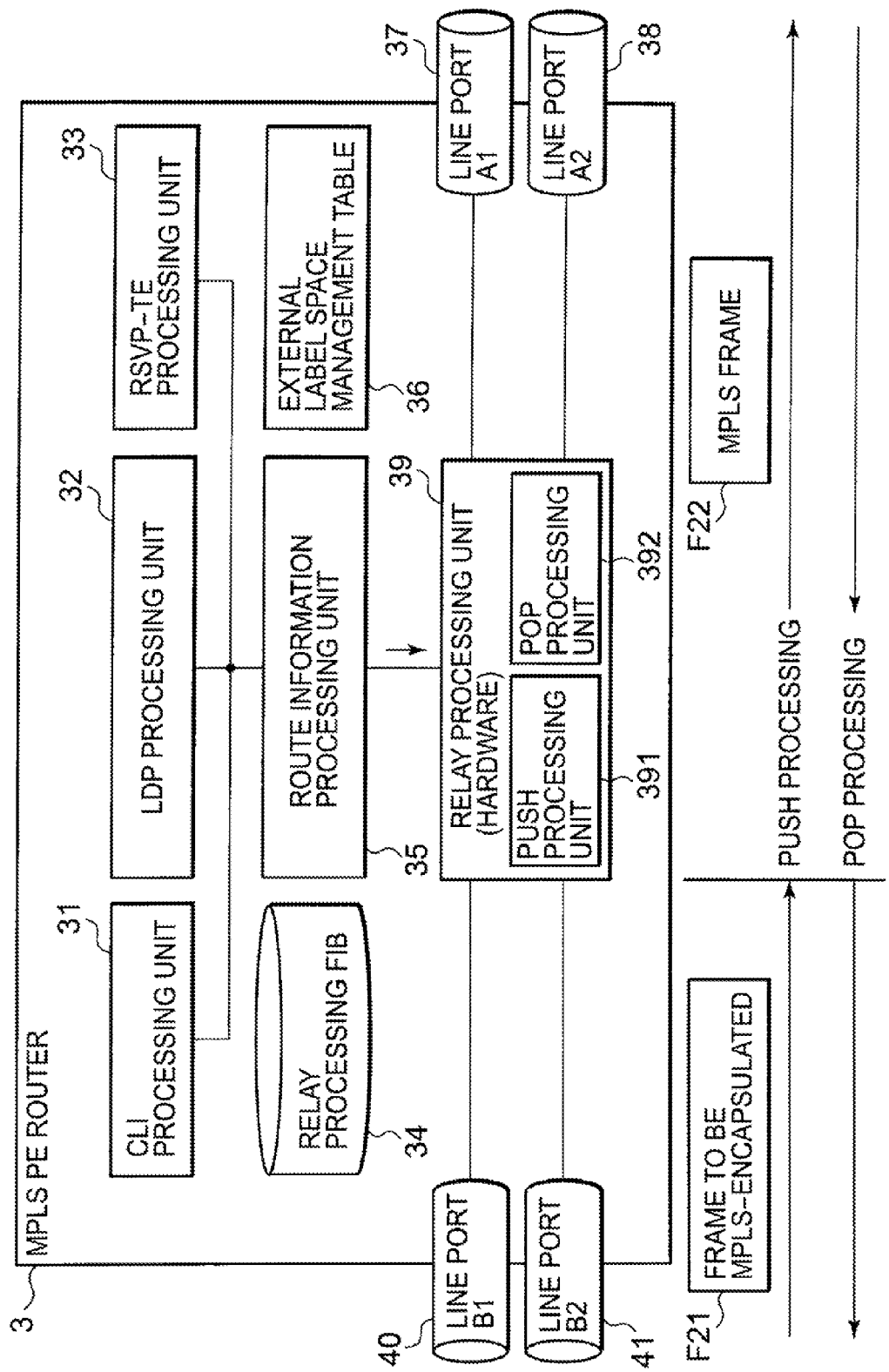
FIG. 1 is a block diagram showing a configuration example of an MPLS edge router according to a related art.

Firstly, referring to FIG. 1, an MPLS (Multi Protocol Label Switching) edge router (Label Edge Router, hereafter abbreviated as LER). Edge routers used in a VPN (Virtual Private Network) service network configured with MPLS are referred to as PE (Provider Edge) routers.

As shown in FIG. 1, an edge router (PE router) 3 according to a related art has a CLI (Command Line Interface) processing unit 3, an LDP (Label Distribution Protocol) processing unit 32, an RSVP-TE (resource ReSerVation Protocol-Traffic Engineering) processing unit 33, a relay processing FIB (Forwarding Information Base) 34, a route information processing unit 35, an external label space management table 36, a line port (A1) 37, a line port (A2) 38, a relay processing unit 39, a line port (B1) 40, and a line port (B2) 41.

The relay processing unit 39 includes a line port (A1) 37 and line port (A2) 38 connected to an MPLS network, and a line port (B1) 40 and line port (B2) 41 connected to a VPN. The relay processing unit 39 also has a PUSH processing unit 391 and a POP processing unit 392.

The PUSH processing unit 391 performs PUSH processing in which a label is added to a frame and the frame is forwarded in an edge router (LER) serving as an entrance to the MPLS network. The POP processing unit 392 performs POP processing in which the label is removed from the frame and the frame is forwarded in an edge router (LER) serving as an exit of the MPLS network.

The relay processing unit 39 performs relay processing for a frame to be MPLS-encapsulated F21 and an MPLS frame F22 according to the relay processing FIB 34 shown in FIG. 2.

The relay processing unit 39, having insufficient scalability, will limit a maximum LSP number. If the relay processing unit 39 is preliminarily assigned with a large maximum LSP number, it will result in increase in size and cost of the router device.

Next, a router device according to a first exemplary embodiment of this invention will be schematically described. The description here will be made on the assumption that a router device (LER) according to this embodiment is a PE (Provider Edge) router used in a VPN service network configured with MPLS (Multi Protocol Label Switching).

The PE router according to the first exemplary embodiment of the invention has a line relay processing unit and a relay processing unit. The line relay processing unit has a PUSH processing unit and a POP processing unit functionally provided therein. The relay processing unit has a SWAP processing unit functionally provided therein. An internal label is used in a connection between the line relay processing unit and the relay processing unit. This configuration makes it possible to improve the scalability for maximum LSP number without substantial restrictions due to hardware resources of the relay processing unit.

The line relay processing unit is capable of including a plurality of lines of a single type. On the other hand, the relay processing unit is capable of including a plurality of line relay processing units. The lines included in the plurality of line relay processing units included in the relay processing unit may be of mutually different types.

Figure 3:
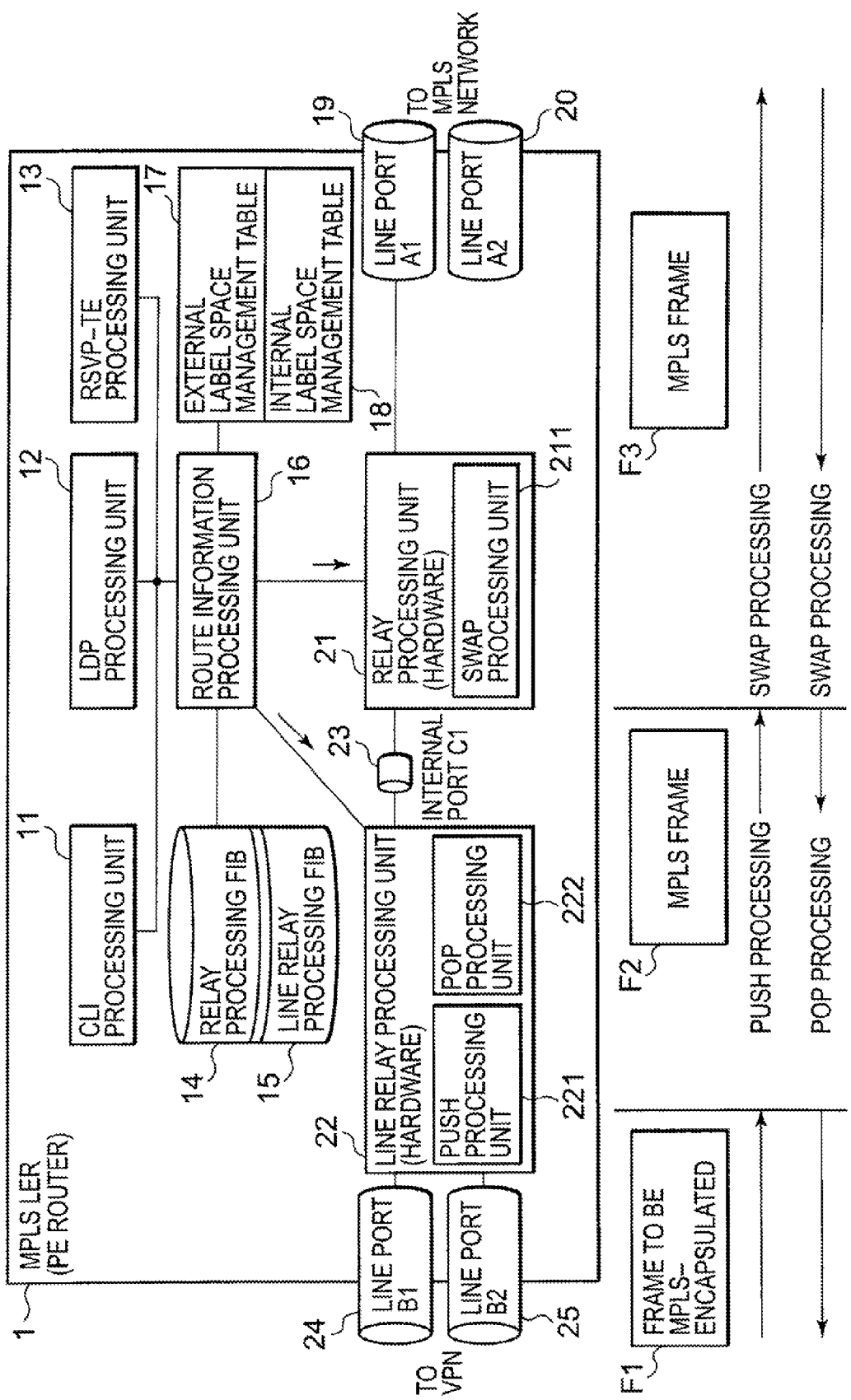
FIG. 3 is a block diagram showing a configuration example of an MPLS edge router according to a first exemplary embodiment of this invention.

Referring to FIG. 3, detailed description will be made of the PE router according to the first exemplary embodiment of this invention.

As shown in FIG. 3, the MPLS PE router 1 according to this embodiment has a CLI (Command Line Interface) processing unit 11, an LDP (Label Distribution Protocol) processing unit 12, an RSVP-TE (resource ReSerVation Protocol-Traffic Engineering) processing unit 13, a relay processing FIB (Forwarding Information Base) 14, a line relay processing FIB 15, a route information processing unit 16, an external label space management table 17, an internal label space management table 18, a line port (A1) 19, a line port (A2) 20, a relay processing unit (hardware) 21, a line relay processing unit (hardware) 22, an internal port (C1) 23, a line port (B1) 24, and a line port (B2) 25.

The line port (A1) 19 and the line port (A2) 20 are connected to an MPLS network, whereas the line port (B1) 24 and the line port (B2) 25 are connected to a VPN.

The relay processing unit 21 has a SWAP processing unit 211. The line relay processing unit 22 has a PUSH processing unit 221 and a POP processing unit 222.

The route information processing unit 16 generates the relay processing FIB 14 and the line relay processing FIB 15 based on the external label space management table 17 and the internal label space management table 18. Additionally, the route information processing unit 16 installs the relay processing FIB 14 and the line relay processing FIB 15 in the relay processing unit 21 and the line relay processing unit 22, respectively.

The relay processing unit 21 and the line relay processing unit 22 perform forwarding of a frame to be MPLS-encapsulated F1 and MPLS frames F2, F3 according to information of the relay processing FIB 14 and the line relay processing FIB 15, respectively.

Figure 4:
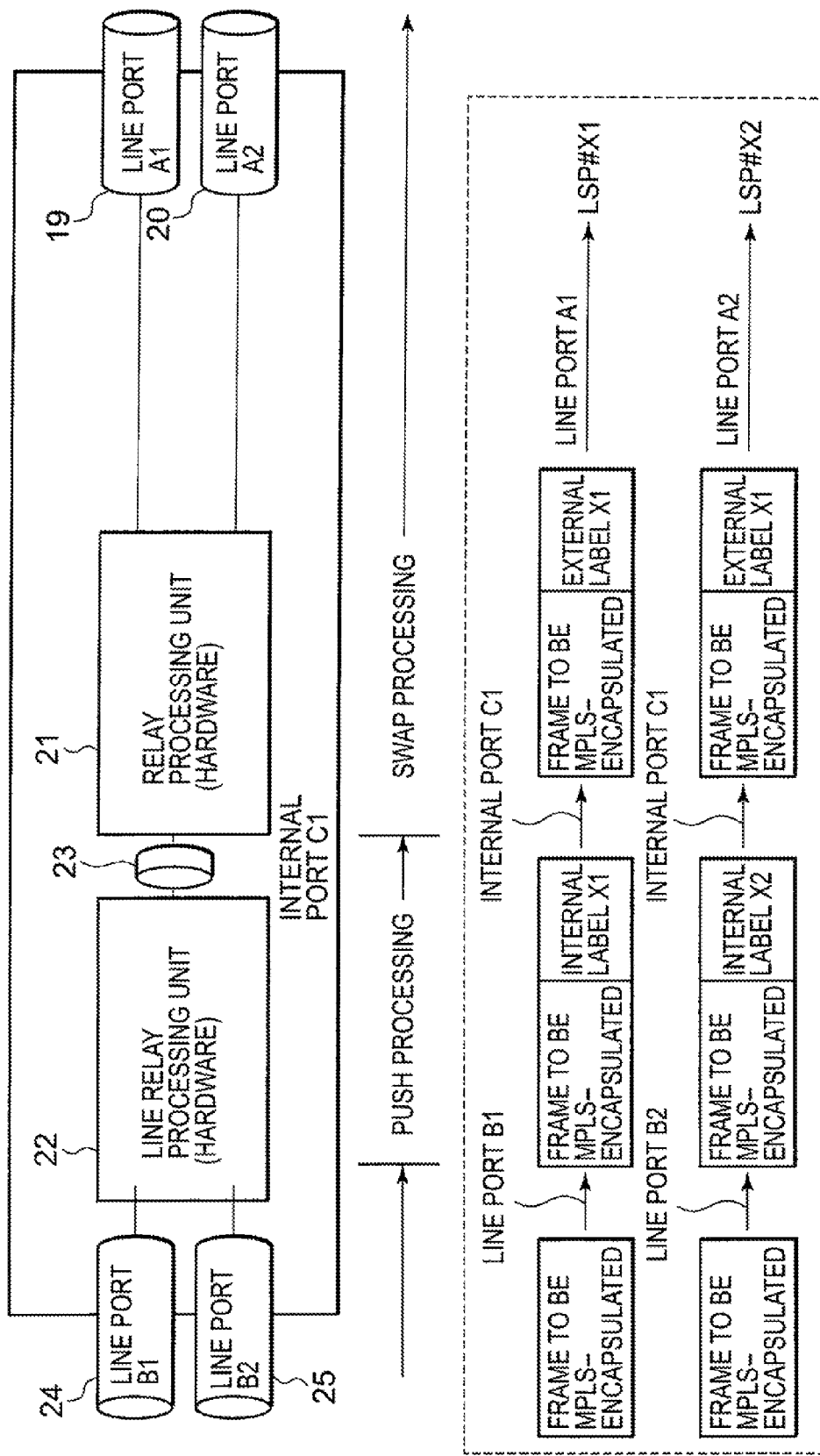
FIG. 4 is a diagram showing an example of a flow of a frame in the edge router shown in FIG. 3.

FIG. 4 shows an example of flows of a frame in the PE router 1. The frame flows shown here include a flow from the line port (B1) 24 to the line port (A1) 19 (LSP#X1) and a flow from the line port (B2) 25 to the line port (A2) 20 (LSP#X2). Both the flows involve PUSH processing.

Figure 5:
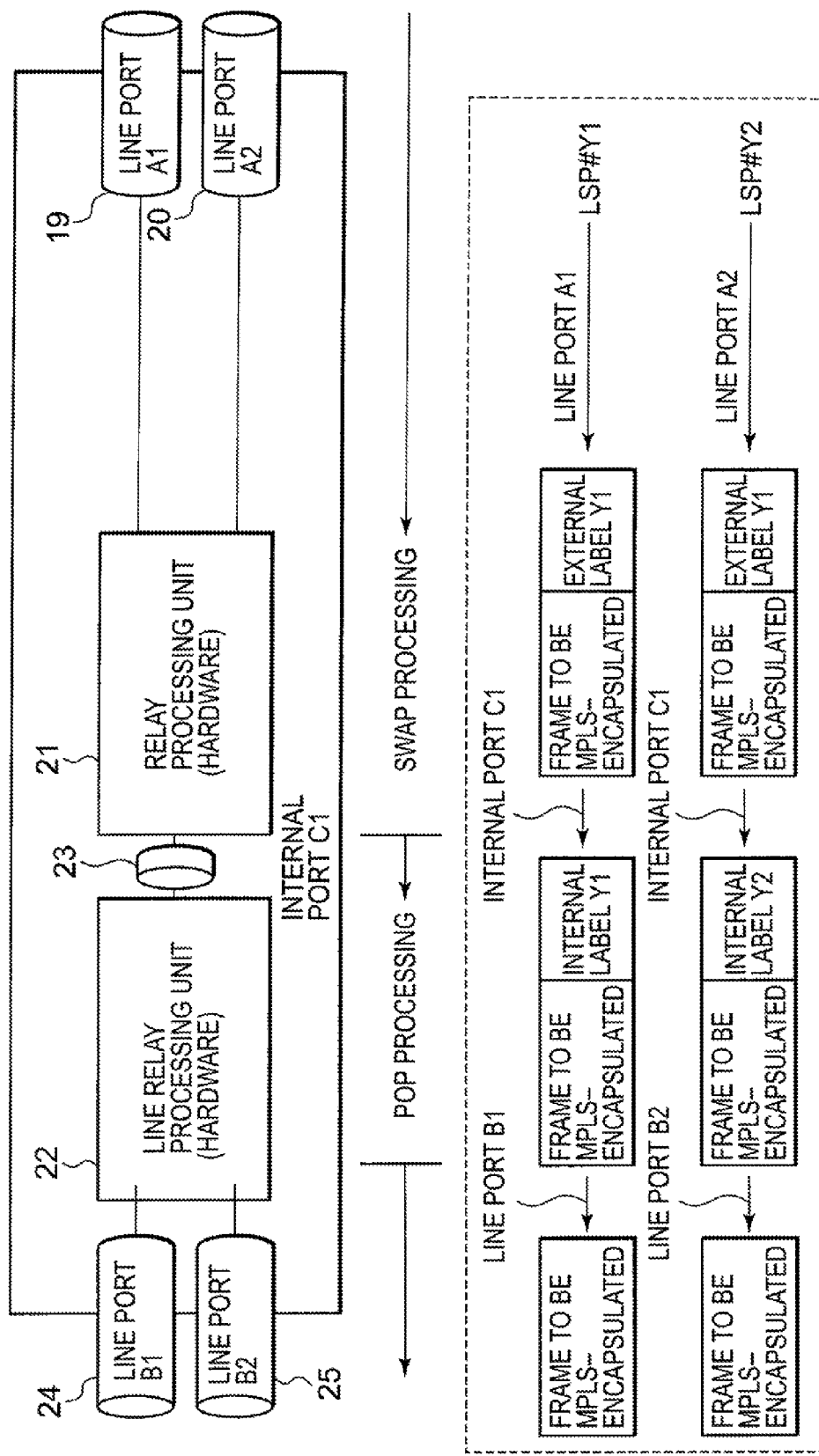
FIG. 5 is a diagram showing another example of a flow of a frame in the edge router shown in FIG. 3.

FIG. 5 shows another example of flows of a frame in the PE router 1. The frame flows shown here include a flow from the line port (A1) 19 (LSP#Y1) to the line port (B1) 24 and a flow from the line port (A2) 20 (LSP#Y2) to the line port (B2) 25. Bothe the frame flows involve POP processing.

According to this embodiment, the functional configuration of the MPLS PE router 1 is changed such that the relay processing unit 21 is provided with a SWAP processing unit 211 and the line relay processing unit 22 is provided with a PUSH processing unit 221 and a POP processing unit 222.

The relay processing unit 21 may be formed so as to be capable of including plurality of internal ports. The relay processing unit 21, which does not perform PUSH processing or POP processing, is capable of minimizing the increase in circuit scale and in manufacturing cost even if the number of the internal ports included in the relay processing unit is increased.

On the other hand, the line relay processing unit 22 is formed such that the number of the line ports to be included therein can be increased or decreased as necessary. The separation of the PUSH processing unit and POP processing unit from the relay processing unit 21 makes it possible to increase or decrease the number of the line ports to be included, without being restricted by the configuration (hardware) of the relay processing unit 21. This means that the number of pieces of hardware required by the line relay processing unit 22 can be increased or decreased according to the increase or decrease of the number of the line ports included therein. Further, the increase in circuit scale and in manufacturing cost can be minimized by limiting the number of the line ports included to a minimal necessary value. The number of the line ports connected to the VPN can be increased also by increasing the number of the line relay processing units 22.

Thus, according to this embodiment of the invention, the restriction to the maximum LSP number due to depletion of hardware resources of the relay processing unit 21 can be avoided, and the scalability for maximum LSP number can be increased.

FIG. 6 shows a configuration example of the relay processing FIB 14, while FIG. 7 shows a configuration example of the line relay processing FIB 15. These configuration examples are for embodying the frame flows shown in FIG. 4 and FIG. 5. Internal labels are used in these configuration examples.

Referring to FIG. 6, a configuration of the relay processing FIB 14 will be described. The relay processing FIB 14 is a table containing items of "LSP number", "reception port", "reception label", "transmission port", "transmission label", and "MPLS processing".

As seen from FIG. 6, in association with "LSP#X1" as "LSP number", "internal port C1" is stored as "reception port", "internal label X1" as "reception label", "line port A1" as "transmission port", "external label X1" as "transmission label", and "SWAP" as "MPLS processing".

In association with "LSP#Y1" as "LSP number", "line port A1" is stored as "reception port", "external label Y1" as "reception label", "internal port C1" as "transmission port", "internal label Y1" as "transmission label", and "SWAP" as "MPLS processing".

In association with "LSP#X2" as "LSP number", "internal port C1" is stored as "reception port", "internal label X2" as "reception label", "line port A2" as "transmission port", "external label X1" as "transmission label", and "SWAP" as "MPLS processing"

Further, in association with "LSP#Y2" as "LSP number", "line port A2" is stored as "reception port", "external label Y2" as "reception label", "internal port C1" as "transmission port", "internal label Y2" as "transmission label", and "SWAP" as "MPLS processing".

Referring to FIG. 7, a configuration of the line relay processing FIB 15 will be described. The line relay processing FIB 15 is a table containing items of "LSP number", "reception port", "reception label", "transmission port", "transmission label", and "MPLS processing".

As seen from FIG. 7, in association with "LSP#X1" as "LSP number", "line port B1" is stored as "reception port", " . . . " as "reception label", "internal port C1" as "transmission port", "internal label X1" as "transmission label", and "PUSH" as "MPLS processing".

In association with "LSP#Y1" as "LSP number", "internal port C1" is stored as "reception port", "internal label Y1" as "reception label", "line port B1" as "transmission port", " . . . " as "transmission label", and "POP" as "MPLS processing".

In association with "LSP#X2" as "LSP number", "line port B2" is stored as "reception port", " . . . " as "reception label", "internal port C1" as transmission port", "internal label X2" as "transmission label", and "PUSH" as "MPLS processing".

In association with "LSP#Y2" as "LSP number", "internal port C1" is stored as "reception port", "internal label Y2" as "reception label", "line port B2" as "transmission port", " . . . " as "transmission label", and "POP" as "MPLS processing".

By the nature of MPLS protocol, MPLS allows overlapped use of output labels (transmission labels) when relevant ports are different, or when a backup tunnel is created for link protection. However, in order to realize MPLS frame forwarding processing, an input port (reception port) and an input label (reception label) must be determined uniquely within the processor. Otherwise, an output port and an output label cannot be determined uniquely for MPLS frame forwarding processing. In order to avoid such problem, this embodiment of the invention employs "internal labels" as described with reference to FIG. 6 and FIG. 7.

If "internal labels" are not employed, the relay processing FIB 14 and the line relay processing FIB 15 will be configured, for example, as shown in FIG. 8 and FIG. 9. In this case, the reception port and reception label associated with the LSP number of LSP#X1 in FIG. 8 are coincident with the reception port and reception label associated with the LSP number of LSP#X2. As a result, the relay processing unit 21 will not be able to determine an appropriate output port (transmission port) and output label (transmission label), and will not be able to forward the MPLS frame or will forward it to an unintended LSP.

According to the embodiment of the invention, internal labels are used in the connection between the relay processing unit 21 and the line relay processing unit 22, whereby an input port (reception port) and an input label (reception label) can be determined uniquely, and thus an appropriate output port (transmission port) and an appropriate output label (transmission label) can be determined uniquely.

Referring again to FIG. 3, the CLI processing unit 11, the LDP processing unit 12 and the RSVP-TE processing unit 13 have a function to issue a label assignment request to the route information processing unit 16 with the use of information on input ports, output ports, and types of MPLS processing.

The route information processing unit 16 has a function to assign external labels and internal labels to the input labels and the output labels by referring to the external label space management table 17 and the internal label space management table 18 in response to the label assignment request.

The route information processing unit 16 also has a function to generate the relay processing FIB 14 and the line relay processing FIB 15 as shown in FIG. 5 and FIG. 6 on the basis of information of assigned external labels and internal labels. The line relay processing FIB 15 may be generated for a plurality of layers of MPLS labels.

Further, the route information processing unit 16 has a function to install the relay processing FIB 14 and the line relay processing FIB 15 in the relay processing unit 21 and the line relay processing unit 22, respectively.

The relay processing unit 21 has an MPLS frame forwarding function to perform SWAP processing according to information in the relay processing FIB 14.

The line relay processing unit 22 has an MPLS frame forwarding function to perform PUSH processing and POP processing according to information in the line relay processing FIB 15. When the line relay processing FIB 15 is generated for a plurality of layers of MPLS labels, the line relay processing unit 22 performs PUSH processing and POP processing in accordance therewith. Further, the line relay processing unit 22 may have a function to enable addition of hardware regardless of types of line ports.

Figure 10:
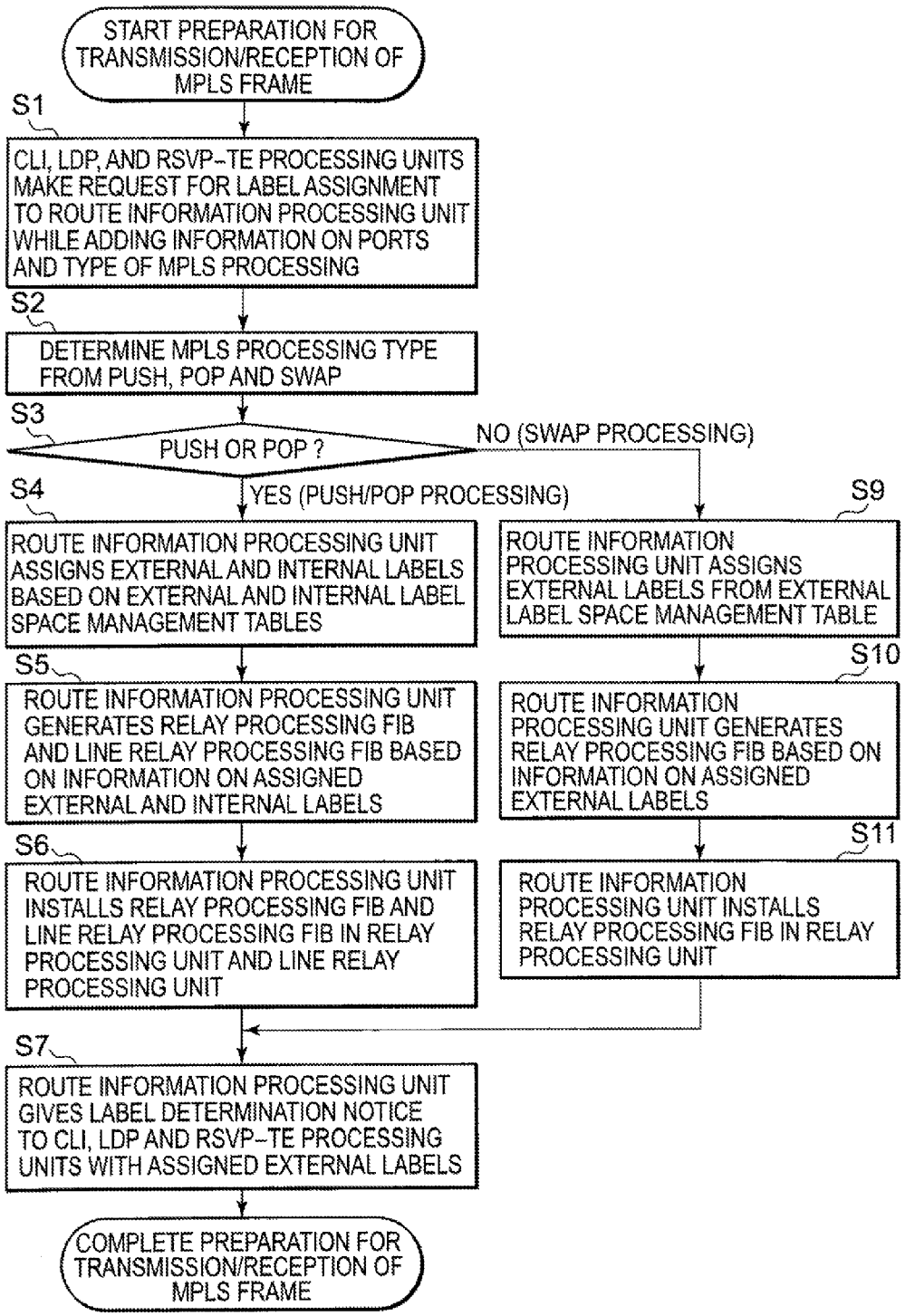
FIG. 10 is a flowchart for explaining processing performed by the edge router shown in FIG. 3 to prepare for transmission and reception of an MPLS frame.
Figure 11:
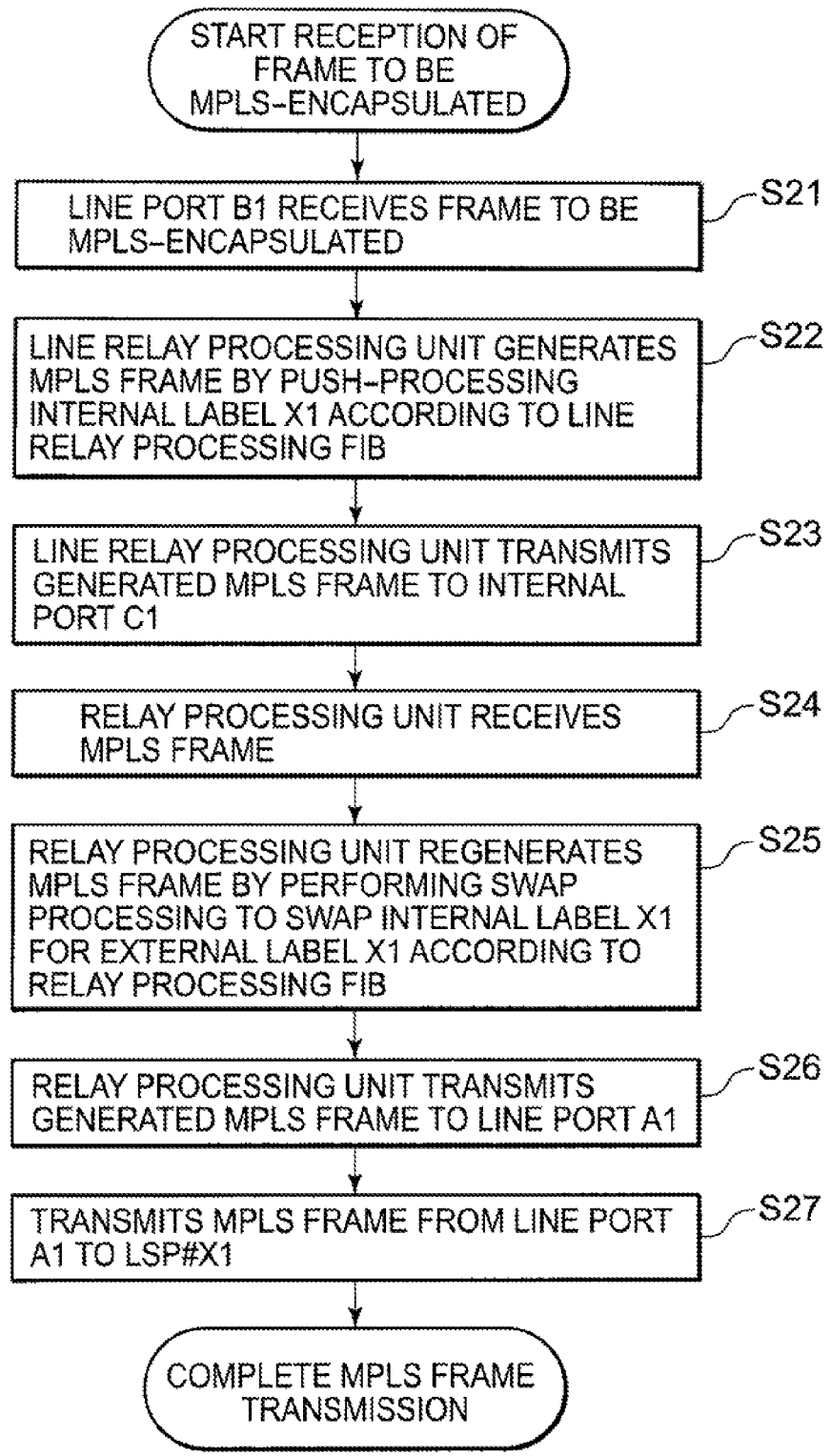
FIG. 11 is a flowchart for explaining processing performed by the edge router shown in FIG. 3 to receive a frame to be MPLS-encapsulated.
Figure 12:
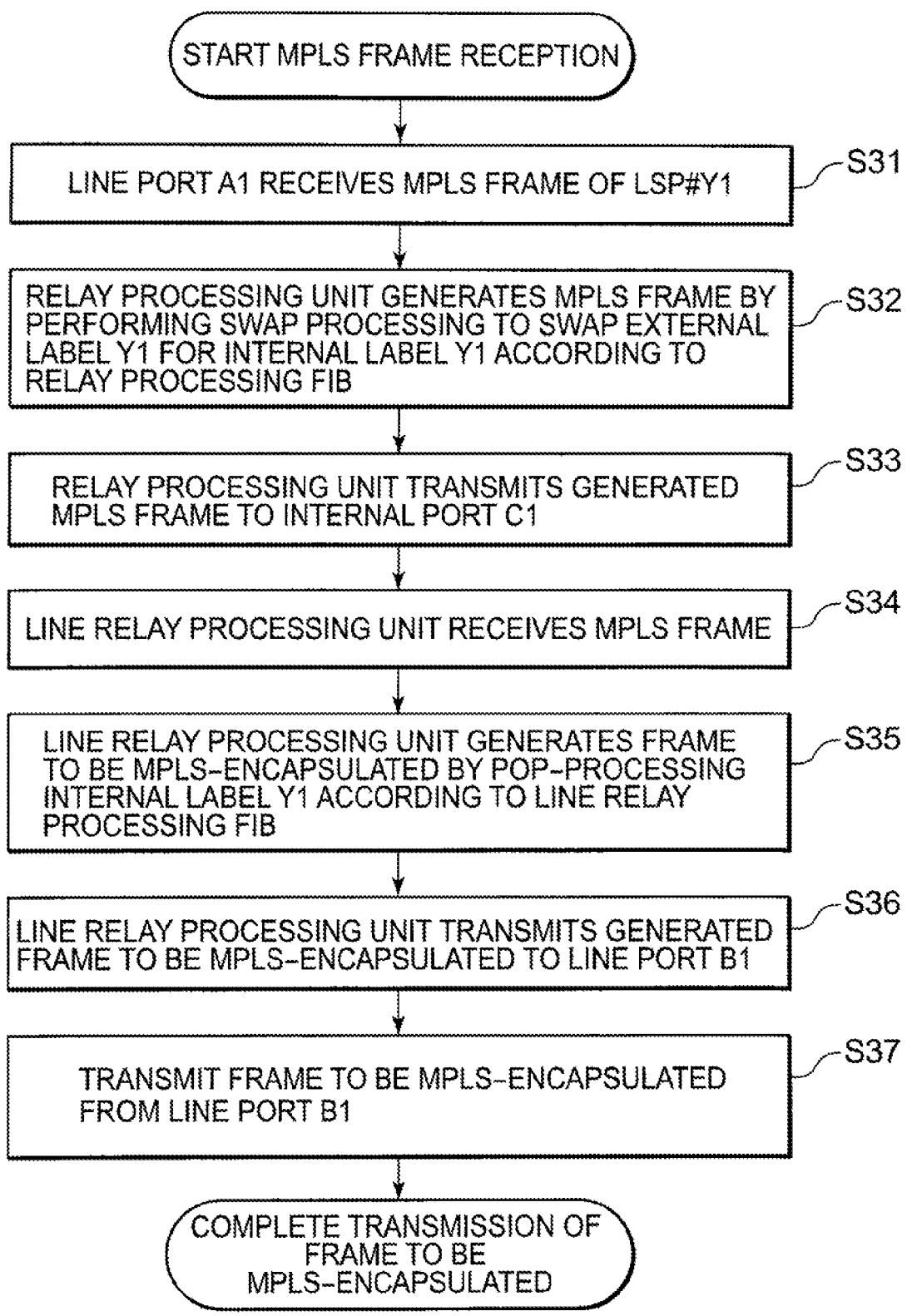
FIG. 12 is a flowchart for explaining processing performed by the edge router shown in FIG. 3 to receive an MPLS frame.

Next, operation of the PE router 1 shown in FIG. 3 will be described with reference to FIGS. 10 to 12. FIG. 10 is a flowchart showing processing performed by the edge router to prepare for transmission and reception of an MPLS frame. FIG. 11 is a flowchart showing processing performed by the PE router 1 to receive a frame to be MPLS-encapsulated. FIG. 12 is a flowchart performed by the PE router 1 to receive an MPLS frame.

First, referring to FIG. 10, description will be made on processing performed by the PE router 1 to prepare for transmission and reception of an MPLS frame.

Upon receiving information on an input port, an output port and a type of MPLS processing from the CLI processing unit 11, the LDP processing unit 12 and the RSVP-TE processing unit 13 (step S1), the route information processing unit 16 determines the type of the MPLS processing from among PUSH processing, POP processing and SWAP processing (step S2).

When the route information processing unit 16 determines that the type of the MPLS processing is PUSH processing or POP processing (YES in step S3), the route information processing unit 16 assigns an external label and an internal label to each input label and output label, based on the external label space management table 17 and the internal label space management table 18 (step S4).

The route information processing unit 16 generates a relay processing FIB 14 and a line relay processing FIB 15 as shown in FIG. 6 and FIG. 7 on the basis of the information on the assigned external labels and internal labels (step S5), and installs the relay processing FIB 14 and the line relay processing FIB 15 in the relay processing unit 21 and the line relay processing unit 22, respectively (step S6).

The route information processing unit 16 supplies the external labels assigned to the input label and the output label to the CLI processing unit 11, the LDP processing unit 12, and the RSVP-TE processing unit 13 (step S7).

When the route information processing unit 16 determines that the type of MPLS processing is SWAP processing (NO in step S3), the route information processing unit 16 assigns external labels to the input label and the output label by referring to the external label space management table 17 (step S9).

The route information processing unit 16 generates a relay processing FIB 14 on the basis of information on the assigned external labels (step S10), and installs the relay processing FIB 14 in the relay processing unit 21 (step S11). The route information processing unit 16 supplies the external labels assigned to the input label and the output label to the CLI processing unit 11, the LDP processing unit 12, and the RSVP-TE processing unit 13 (step S7).

Next, referring to FIG. 11, description will be made of processing performed by the PE router 1 to receive a frame to be MPLS-encapsulated F1. The description here will be made of a case in which an MPLS-encapsulated frame F1 received by the line port (B1) 24 is forwarded to the line port (A1) 19 (LSP#X1 in FIG. 4).

Once the line port (B1) 24 receives a frame to be MPLS-encapsulated F1 (step S21), the frame to be MPLS-encapsulated F1 is supplied to the line relay processing unit 22. The line relay processing unit 22 performs PUSH processing according to the line relay processing FIB 15 (step S22). This means that the line relay processing unit 22 performs processing on the frame to be MPLS-encapsulated F1 to add an internal label X1 thereto, and thereby generates an MPLS frame F2. The line relay processing unit 22 then transmits the generated MPLS frame F2 to the internal port (C1) 23 (step S23).

Upon receiving the MPLS frame 2 via the internal port (C1) 23 (step S24), the relay processing unit 21 performs SWAP processing according to the relay processing FIB 14 (step S25). Specifically, the relay processing unit 21 generates an MPLS frame F3 by swapping the internal label X1 for an external label X1. The relay processing unit 21 then transmits the generated MPLS frame F3 to the line port (A1) 19 (step S26). The MPLS frame F3 is transmitted from the line port (A1) 19 to the MPLS network (LSP#X1) (step S27).

Next, referring to FIG. 12, description will be made of processing performed by the PE router 1 to receive an MPLS frame. The description here will be made of a case in which an MPLS-encapsulated frame F3 received by the line port (A1) 19 is forwarded to the line port (B1) 24 (LSP#Y1 in FIG. 5).

Once the line port (A1) 19 receives an MPLS frame F3 from the MPLS network (LSP#Y1) (step S31), the MPLS frame F3 is supplied to the relay processing unit 21. According to the relay processing FIB 14, the relay processing unit 21 performs SWAP processing by swapping the external label Y1 for an internal label Y1, and generates an MPLS frame F2 (step S32). The relay processing unit 21 transmits the generated MPLS frame F2 to the internal port (C1) 23 (step S33).

Upon receiving the MPLS frame F2 via the internal port (C1) 23 (step S34), the line relay processing unit 22 performs POP processing to remove the internal label Y1, according to the line relay processing FIB 15, and generates a frame to be MPLS-encapsulated F1 (step S35). The line relay processing unit 22 transmits the generated frame to be MPLS-encapsulated F1 to the line port (B1) 24 (step S36). The frame to be MPLS-encapsulated F1 is transmitted from the line port (B1) 24 to the VPN (step S37).

According to this embodiment of the invention, as described above, the line relay processing unit 22 having the PUSH processing unit and POP processing unit for performing processing which consumes more hardware resources than SWAP processing is provided separately from the relay processing unit 21 having the SWAP processing unit. This makes it possible to improve the scalability for maximum LSP number of the PE router 1 regardless of the limit to expansion of hardware resources of the relay processing unit 21.

Further, according to this embodiment in which the line relay processing unit 22 having the PUSH processing unit and POP processing unit is provided separately from the relay processing unit 21 having the SWAP processing unit, it is made possible to add hardware only for the line relay processing unit 22, and thus to improve the scalability for maximum LSP number of the PE router 1 regardless of the limit to expansion of hardware resources of the relay processing unit 21.

Further, according to this embodiment in which hardware can be added to the line relay processing unit 22 regardless of types of the line ports, the router device is enabled to provide, as a PE router, variety of services for various types of lines.

Still further, according to this embodiment in which addition of hardware is possible to the line relay processing unit 22 regardless of types of the line ports, the router device is enabled to provide a variety of services for various types of lines as a PE router, while improving the scalability for maximum LSP number.

Figure 13:
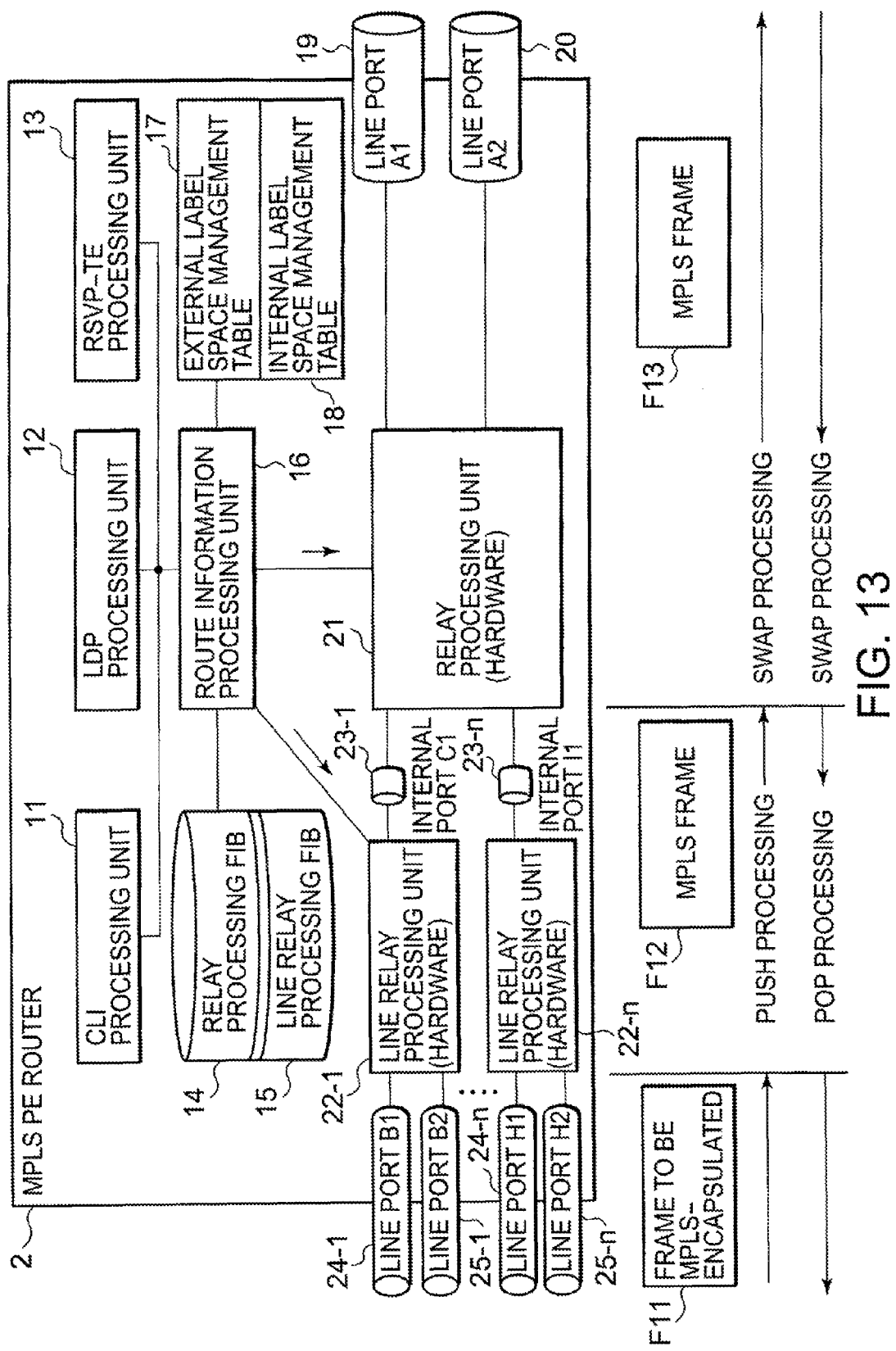
FIG. 13 is a block diagram showing a configuration example of an MPLS edge router according to a second exemplary embodiment of this invention.

Next, a second exemplary embodiment of this invention will be described with reference to FIG. 13. FIG. 13 is a block diagram showing a configuration example of a PE router 2 according to the second exemplary embodiment. The configuration of the PE router according to this second exemplary embodiment is basically similar to that of the first exemplary embodiment, whereas the improvement of scalability by addition of hardware to the line relay processing unit 22 is further enhanced.

As shown in FIG. 13, the relay processing unit 21 has a function to include a plurality of (first to n-th) line relay processing units 22-1 to 22-n through a plurality of (first to n-th) internal ports (C1, . . . , I1) 23-1 to 23-n.

Each of the line relay processing units 22-1 to 22-n has a function to include a plurality of line ports. FIG. 13 shows a case in which each of the line relay processing units 22-1 to 22-n includes two line ports. For example, the line relay processing unit 22-1 includes a line port (B1) 24-1 and a line port (B2) 25-1, and the line relay processing unit 22-n includes a line port (H1) 24-n and a line port (H2) 25-n.

Each of the line relay processing units 22-1 to 22-*n* has a function to include line ports for lines of an arbitrary single type. This means that the type of line ports included by each of the line relay processing units 22-1 to 22-*n* may be identical to or different from those of the line ports included by other line relay processing units.

According to the second exemplary embodiment of the invention, as described above, line relay processing units for identical or different types of lines can be added. This makes it possible to improve the scalability for maximum LSP number of the PE router 2 having the line ports (B1) 24-1, (B2) 25-1, . . . , (H1) 24-*n*, and (H2) 25-*n* which are for the identical or different types of lines.

Although this invention has been described in terms of presently preferred embodiments thereof, it is to be understood that the invention is not limited to these embodiments but may be variously changed and modified without departing from the scope of the invention. For example, this invention is also applicable to router devices for use in EOMPLS (Ethernet (registered trademark) over MPLS), ATMoMPLS (Asynchronous Transfer Mode over MPLS), TIDMoMPLS (Time Division Multiplexing over MPLS) and so on. The invention is further applicable to router devices for realizing RFC4447 PW (PseudoWire) setup.

What is claimed is:

1. A router for relaying a frame in an MPLS (Multi Protocol label Switching) network, the router comprising:
    a line relay processing unit including a PUSH processing unit which adds a label to the frame and forwards the frame, and a POP processing unit which removes the label from the frame and forwards the frame;
    a relay processing unit including a SWAP processing unit which swaps the label of the frame and forwards the frame, and
    a route information processing unit connected to both of the line relay processing unit and the relay processing unit to install line relay processing forwarding information base and relay processing forwarding information base in the line relay processing unit and the relay processing unit, respectively.

2. The router as claimed in claim 1, wherein an internal label is used in a connection between the line relay processing unit and the relay processing unit.

3. The router as claimed in claim 1, wherein the line relay processing unit includes a plurality of lines of a single type; and
    the relay processing unit includes a plurality of such line relay processing units.

4. The router as claimed in claim 3, wherein the relay processing unit includes a combination of a first line relay processing unit for including a plurality of lines of a single type and a second line relay processing unit for including a plurality of lines of another single type.

5. The router as claimed in claim 3, wherein the router is for use in EoMPLS (Ethernet (registered trademark) over MPLS), ATMoMPLS (Asynchronous Transfer Mode over MPLS), and TDMoMPLS (Time Division Multiplexing over MPLS) networks.

6. The router as claimed in claim 1, wherein the router handles a plurality of layers of labels.

7. The router as claimed in claim 1, wherein the router is an edge router used in the MPLS network.

8. A scalability improvement method for use in a router for relaying a frame in an MPLS (Multi Protocol Label Switching) network, the scalability improvement method comprising the steps of:
    providing a line relay processing unit including a PUSH processing unit which adds a label to the frame and forwards the frame, and a POP processing unit which removes the label from the frame and forwards the frame;
    providing a relay processing unit including a SWAP processing unit which swaps the label of the frame and forwards the frame, and
    installing, with a route information processing unit connected to both of the line relay processing unit and the relay processing unit, line relay processing forwarding information base and relay processing forwarding information base in the line relay processing unit and the relay processing unit, respectively.

9. The scalability improvement method as claimed in claim 8, wherein an internal label is used in a connection between the line relay processing unit and the relay processing unit.

10. The scalability improvement method as claimed in claim 8, wherein:
    the line relay processing unit includes a plurality of lines of a single type; and
    the relay processing unit includes a plurality of such line relay processing units.

11. The scalability improvement method as claimed in claim 10, wherein the relay processing unit includes a combination of a line relay processing unit which includes a plurality of lines of a single type and another line relay processing unit which includes a plurality of lines of another single type.

12. The scalability improvement method as claimed in claim 10, wherein the method is for use in EoMPLS (Ethernet (registered trademark) over MPLS), ATMoMPLS (Asynchronous Transfer Mode over MPLS), and TDMoMPLS (Time Division Multiplexing over MPLS) networks.

13. The scalability improvement method as claimed in claim 8, wherein the method handles a plurality of layers of labels.

14. The scalability improvement method as claimed in claim 8, wherein the method is for an edge router used in the MPLS network.

15. A router for relaying a frame in an MPLS (Multi Protocol Label Switching) network, the router comprising:
    a line relay processing unit including a PUSH processing means for adding a label to the frame and forwarding the frame, and a POP processing means for removing the label from the frame and forwarding the frame;
    a relay processing unit including a SWAP processing means for swapping the label of the frame and forwarding the frame, and
    a route information processing means connected to both of the line relay processing unit and the relay processing unit for installing line relay processing forwarding information base and relay processing forwarding information base in the line relay processing unit and the relay processing unit, respectively.

* * * * *